US012604858B2

(12) United States Patent
Liang

(10) Patent No.: US 12,604,858 B2
(45) Date of Patent: Apr. 21, 2026

(54) COMBINED CAT HOUSE CAPABLE OF BEING BUILT IN LEVELS

(71) Applicant: Zhejiang Sci-Tech University, Hangzhou (CN)

(72) Inventor: Xueyong Liang, Hangzhou (CN)

(73) Assignee: ZHEJIANG SCI-TECH UNIVERSITY, Hangzhou (CN)

( * ) Notice: Subject to any disclaimer, the term of this patent is extended or adjusted under 35 U.S.C. 154(b) by 0 days.

(21) Appl. No.: 19/049,336

(22) Filed: Feb. 10, 2025

(65) Prior Publication Data

US 2025/0311694 A1 Oct. 9, 2025

(30) Foreign Application Priority Data

Apr. 7, 2024 (CN) ......................... 202420697700.X

(51) Int. Cl.
*A01K 1/03* (2006.01)
(52) U.S. Cl.
CPC .................................... *A01K 1/033* (2013.01)
(58) Field of Classification Search
CPC ..................................................... A01K 1/033
See application file for complete search history.

(56) References Cited

U.S. PATENT DOCUMENTS 5,964,189 A * 10/1999 Northrop ............... A01K 1/033
119/482
6,431,119 B1 * 8/2002 Beymer ................. A01K 1/033
119/485

6,808,074 B1 * 10/2004 Schwartz ........... A47B 47/0041
312/265.5
7,337,748 B1 * 3/2008 Morris ................. A01K 15/025
119/485
7,584,720 B1 * 9/2009 Jackson ................ A01K 1/033
119/482
9,370,165 B2 * 6/2016 de Bien ................ A01K 1/034
2005/0051108 A1 * 3/2005 Syrigos ................ A01K 1/035
119/416
2008/0196675 A1 * 8/2008 Murrer ................. A01K 15/027
119/706
2013/0014703 A1 * 1/2013 Flannery ............... A01K 1/033
119/474

(Continued)

FOREIGN PATENT DOCUMENTS

CN 214961795 U 12/2021

*Primary Examiner* — Timothy D Collins
*Assistant Examiner* — Brittany A Lowery
(74) *Attorney, Agent, or Firm* — Tutunjian & Bitetto, P.C.

(57) ABSTRACT

Provided is a combined cat house capable of being built in levels, including a single-level or multi-level cat house. The single-level cat house includes transverse plates, side plates and a central separator plate. The side plates include a left side plate and a right side plate. Multiple slots are formed in lower and upper side faces of the transverse plate. The left side plate, the right side plate, the central separator plate are fixed to an upper transverse plate and a lower transverse plate by the slots in an inserting manner. A transverse plate hole and a separator plate hole are formed in the transverse plate and the central separator plate for passing through, respectively. A multi-level cat house is formed by continuously inserting the side plate, the central separator plate and the transverse plate.

9 Claims, 8 Drawing Sheets

(56)     References Cited

U.S. PATENT DOCUMENTS

| | | | | |
|---|---|---|---|---|
| 2013/0036986 A1* | 2/2013 | Callari | A01K 1/035 | |
| | | | | 493/344 |
| 2014/0230746 A1* | 8/2014 | Chapman | A01K 1/03 | |
| | | | | 119/497 |
| 2016/0338316 A1* | 11/2016 | Niedwick | A01K 1/0353 | |
| 2017/0339916 A1* | 11/2017 | Deraps | A01K 15/027 | |
| 2019/0230895 A1* | 8/2019 | Lin | A01K 1/035 | |
| 2020/0146256 A1* | 5/2020 | Chen | F16B 5/0012 | |
| 2023/0086447 A1* | 3/2023 | Lan | A01K 1/033 | |
| | | | | 119/416 |

* cited by examiner

COMBINED CAT HOUSE CAPABLE OF BEING BUILT IN LEVELS

CROSS-REFERENCE TO RELATED APPLICATION

This patent application claims the benefit and priority of Chinese Patent Application No. 202420697700X filed with the China National Intellectual Property Administration on Apr. 7, 2024, the disclosure of which is incorporated by reference herein in its entirety as part of the present application.

TECHNICAL FIELD

The present disclosure relates to pet supplies, and in particular to a combined cat house capable of being built in levels.

BACKGROUND

In the current pet market, the cat house is mainly made of wood. Although it has good stability, there are many common problems such as heavy weight, difficult installation, high transportation cost and high price. The cat house may also be made of cloth, which is soft and easy to collapse, cannot be used by overlapping, and occupy a lot of space.

In Chinese Patent with a Pub. No. CN214961795U, a three-dimensional combined cat house is provided, which includes a main cat house located at the bottom, where a top surface of the main cat house is provided with a first connector; and an auxiliary cat house arranged on the roof of the main cat, where a bottom surface of the auxiliary cat house is provided with a second connector. The first connector is detachably connected to the second connector. An opening is formed in a roof end of the auxiliary cat house, and the auxiliary cat house can be vertically sleeved outside the main cat house after being inverted. The cat house is irregular in structure, large in floor area, irrational in actual space use of the upper level in the cat house, small in bottom space, unstable in overall structure, and easy to turn over.

Based on above condition, the present disclosure provides a combined cat house capable of being built in levels to solve the problems above.

SUMMARY

In order to solve the problem in the background art, some embodiments aim to provide a combined cat house capable of being built in levels.

The technical solution of the present disclosure is as follows.

A combined cat house capable of being built in levels includes a single-level cat house or a multi-level cat house, where the single-level cat house includes transverse plates, side plates, and a central separator plate; the side plates include a left side plate and a right side plate; multiple slots are formed in a lower side face and an upper side face of each of the transverse plates, the transverse plates includes an upper transverse plate and a lower transverse plate; the left side plate, the right side plate and the central separator plate are fixed to the upper transverse plate and the lower transverse plate by the multiple slots in an inserting manner; a transverse plate hole for passing through is formed in each of the transverse plates, and a separator plate hole for passing through is formed in the central separator plate; and the multi-level cat house is formed by continuously inserting the side plates, the central separator plate and the transverse plates. The transverse plate hole for the cat to move up and down is formed in the transverse plate, the separator plate hole for the cat to pass through is formed in the central separator plate, and these holes allow the cat to explore all directions in the cat house. Secondly, the upper and lower transverse plates have the same shape and size, and the left and right side plates have the same shape and size, which makes the installation process more convenient. The single-level cat house can be built through the detachable installation between components.

Further, the multiple slots include semi-circular grooves on both sides of each of the transverse plates and an arc groove in a middle of each of the transverse plates, each of the semi-circular grooves is configured for being inserted with a corresponding one of the side plates, and the arc groove is configured for being inserted with the central separator plate.

Further, each of an upper side and a lower side of each of the side plates is provided with a slide latch, the slide latch is slidingly fixed after passing through slide latch holes in a corresponding one of the side plates and a corresponding one of the transverse plates, thus reinforcing the firmness of the side plate and the transverse plate after installation.

Further, both sides of each of the side plates are provided with a twist fastener and an insert connector, respectively; a locking bole is formed in each of the insert connector and the side plate; after the insert connector is fixed to the side plate, an elongated hole formed at a joint of the insert connector and the corresponding one of the side plates is configured for being inserted with a first felt; and the twist fastener is inserted into the corresponding one of the side plates, and then is rotatably fixed after passing through the first felt and the locking hole formed in the insert connector, such that the first felt can be fixed to the side plate, and the first felt can be prevented from being tom down by the cat.

Further, each of the transverse plates is provided with a connector set.

Further, the connector set includes a short seal and a long seal; an opening is formed in each of the short seal and the long seal, a protruded member is arranged on an inner side of the short seal. The felt can penetrate through the opening, a hole on the felt is hooked by the protruded member, such that the effect of fixing the felt is achieved. The fixation effect of the short seal is better, and thus can be installed in a groove at a bottom ring of the transverse plate for fixing the suspended felt. An opening is formed in the long seal, and a barb member is arranged beneath the opening of the long seal. The barb member has a narrow upper part and a wide lower part. The felt, after being inserted into the opening, can be tightly hooked by the barb member, and thus a certain effect of fixing the felt is also achieved.

Further, the connector set includes a central seal, the central seal is arranged in one of the multiple slots in a middle of each of the transverse plates, a circular hole is formed in the central seal, and a rotating member is inserted into the circular hole. The rotating member is divided into two pieces for opposite insertion, and can be used for clamping the second felt.

Further, when one of the transverse plates is a transverse plate at a bottom layer of the combined cat house, a foot-pad member is arranged on a corresponding one of the slots formed in the lower side face of each of the one of the transverse plates at the bottom layer of the combined cat house, and a soft foot pad is arranged at a bottom of the foot-pad member to play an anti-skid role.

Further, any two single-level cat houses adjacent to each other up and down are connected by a same one of the transverse plates. In any single-level or multi-level cat house, the connector set on the top transverse plate has one central seal, two semicircular seals and two long seals, which has the effects of fixing the felt, reducing the exposure of reinforcing ribs and making the surface of the transverse plate completer and more beautiful.

Further, a hanging hole is formed in the lower side face of each of the transverse plates for hanging a cat teasing product.

According to the combined cat house capable of being built in levels, a modular structure is provided, which is convenient for assembly and disassembly, and can reduce transportation cost and save space. The design of the cat house considers the comfort of cats, and provides rich activity space and rest nest. The overall design brings a user a simpler, more practical and comfortable experience, and enhances the competitiveness and market demand of the product.

Figure 1:
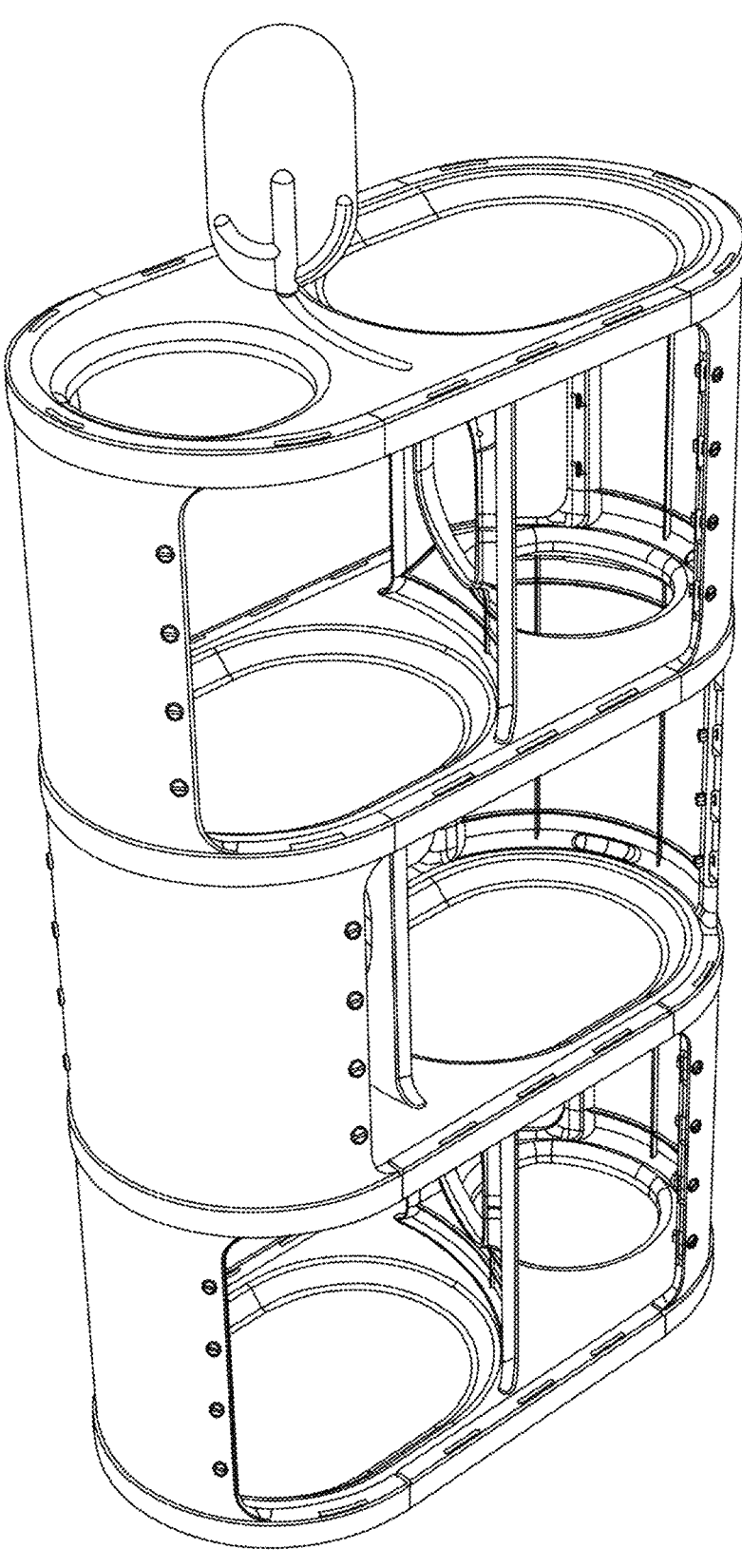
FIG. 1 is a schematic diagram of a multi-level cat house according to the present disclosure.
Figure 2:
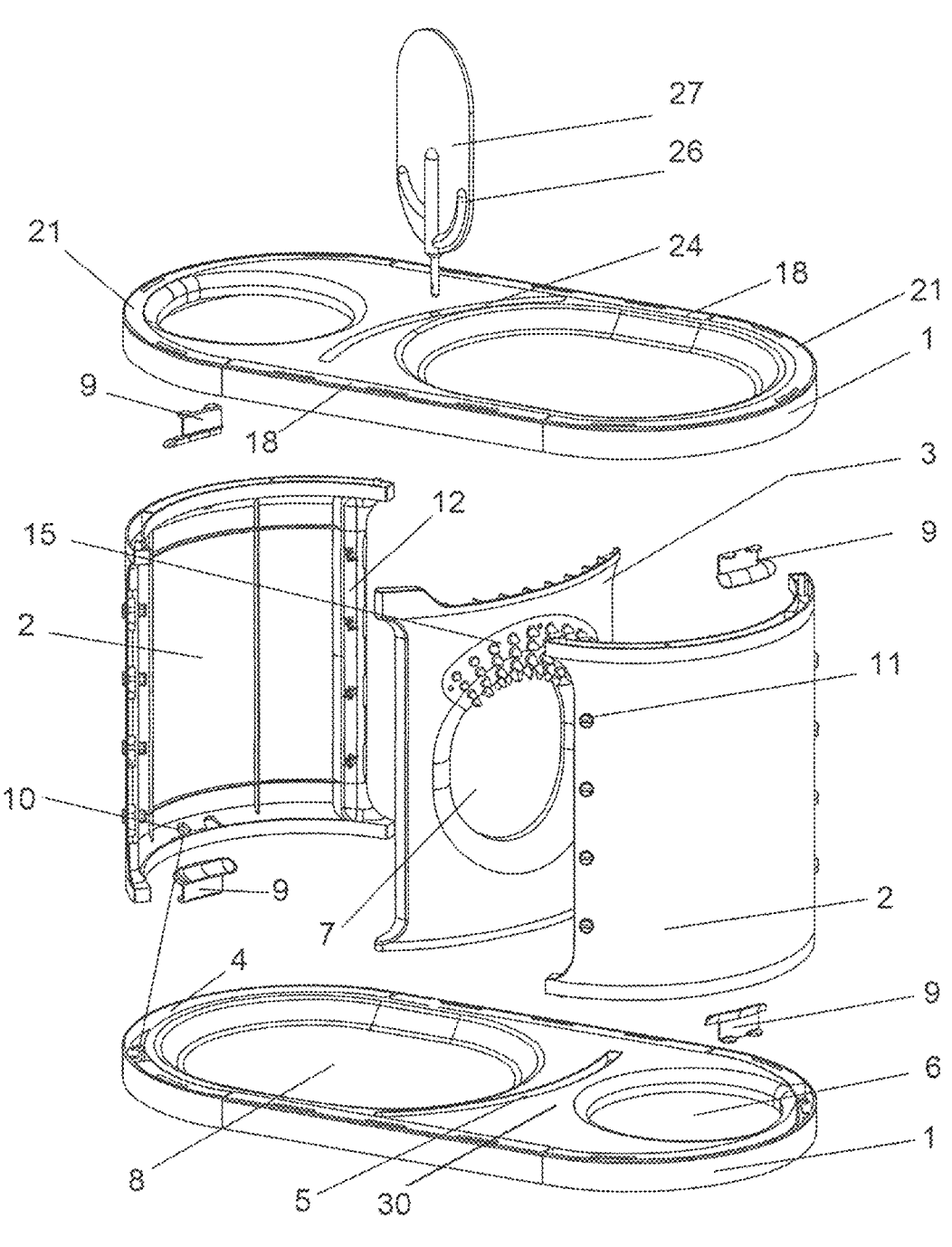
FIG. 2 is an exploded view of an overall structure of a single-level cat house according to the present disclosure.
Figure 3:
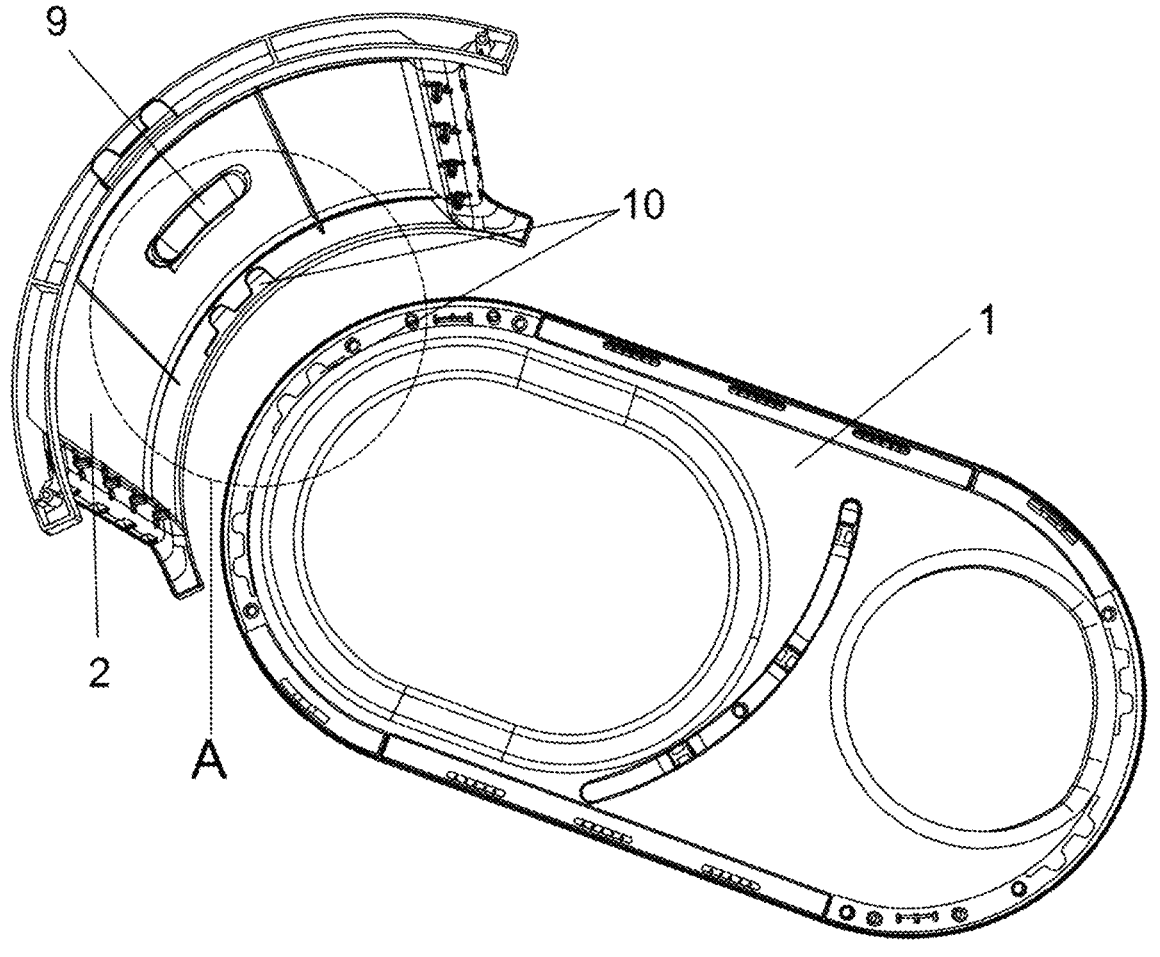
FIG. 3 is an exploded view of side plate and transverse plate structures according to the present disclosure.
Figure 4:
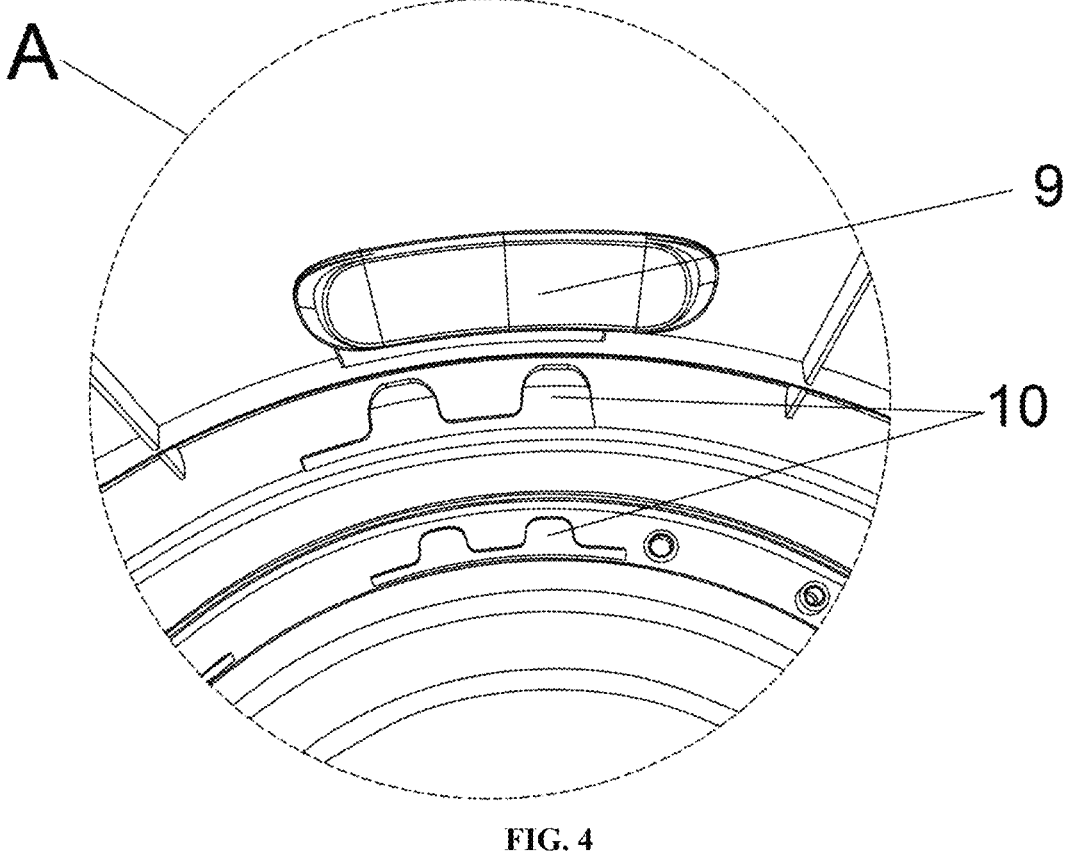
FIG. 4 is an enlarged view of position A in FIG. 2.

The reference numerals in the drawings are as follows: 1 transverse plate; 2 side plate; 3 central separator plate; 4 semi-circular groove; 5 arc groove; 6 transverse plate hole; 7 separator plate hole; 8 nest; 9 slide latch; 10 slide latch hole site; 11 twist fastener; 12 insert connector; 13 locking hole; 14 elongated hole; 15 flexible thorn; 16 first felt; 17 short seal; 18 long seal; 19 protruded member; 20 barb member; 21 semi-circular seal; 22 foot-pad member; 23 soft foot pad; 24 central seal; 25 circular hole; 26 rotating member; 27 second felt; 28 opening site; 29 hanging hole; 30 upper side face and 31 lower side face.

DETAILED DESCRIPTION OF THE EMBODIMENTS

The present disclosure is further described in detail below with reference to accompanying drawings and specific embodiments.

Referring to FIG. 1 to FIG. 9, a combined cat house capable of being built in levels includes a single-level or multi-level cat house. The single-level cat house includes transverse plates 1, side plates 2 and a central separator plate 3. The side plates 2 include a left side plate and a right side plate. Multiple slots are formed in upper side faces 30 and lower side faces 31 of the transverse plate 1. The left side plate 2, the right side plate 2 and the central separator plate 3 are fixed to the upper transverse plate 1 and the lower transverse plate 1 by the slots in an inserting manner. A transverse plate hole 6 and a separator plate hole 7 are formed in the transverse plate 1 and the central separator plate 3 for passing through, respectively. The multi-level cat house is formed by continuously inserting the side plate 2, the central separator plate 3, and the transverse plate 1.

The slots include semi-circular grooves 4 on both sides of the transverse plate, and an arc groove 5 in the middle of the transverse plate. The semi-circular groove 4 is configured for being inserted with the side plate 2, and the arc groove 5 is configured for being inserted with the central separator plate 3.

The transverse plate hole 6 for a cat to move up and down is formed in the transverse plate 1, the separator plate hole 7 for the cat to pass through is formed in the central separator plate, and these holes allow the cat to explore all directions in the cat house. Flexible thorns 15 are also arranged on the separator plate hole 7 for the cat to scratch and decompress. A concave nest 8 is further arranged on the transparent plate 1 for the cat to take a nap and rest.

Secondly, the upper and lower transverse plates 1 have the same shape and size and the left and right side plates 2 have the same shape and size, which makes the installation process more convenient. The single-level cat house can be built through the detachable installation between components.

As shown in FIG. 3, FIG. 4, FIG. 5, and FIG. 9, each of an upper side and a lower side of the side plate 2 is provided with a slide latch 9, and the slide latch 9 is slidingly fixed after passing through slide latch holes 10 in the side plate 2 and the transverse plate 1, thus reinforcing the firmness of the left and right side plates 2 and the upper and lower transverse plates 1 after installation.

Figure 5:
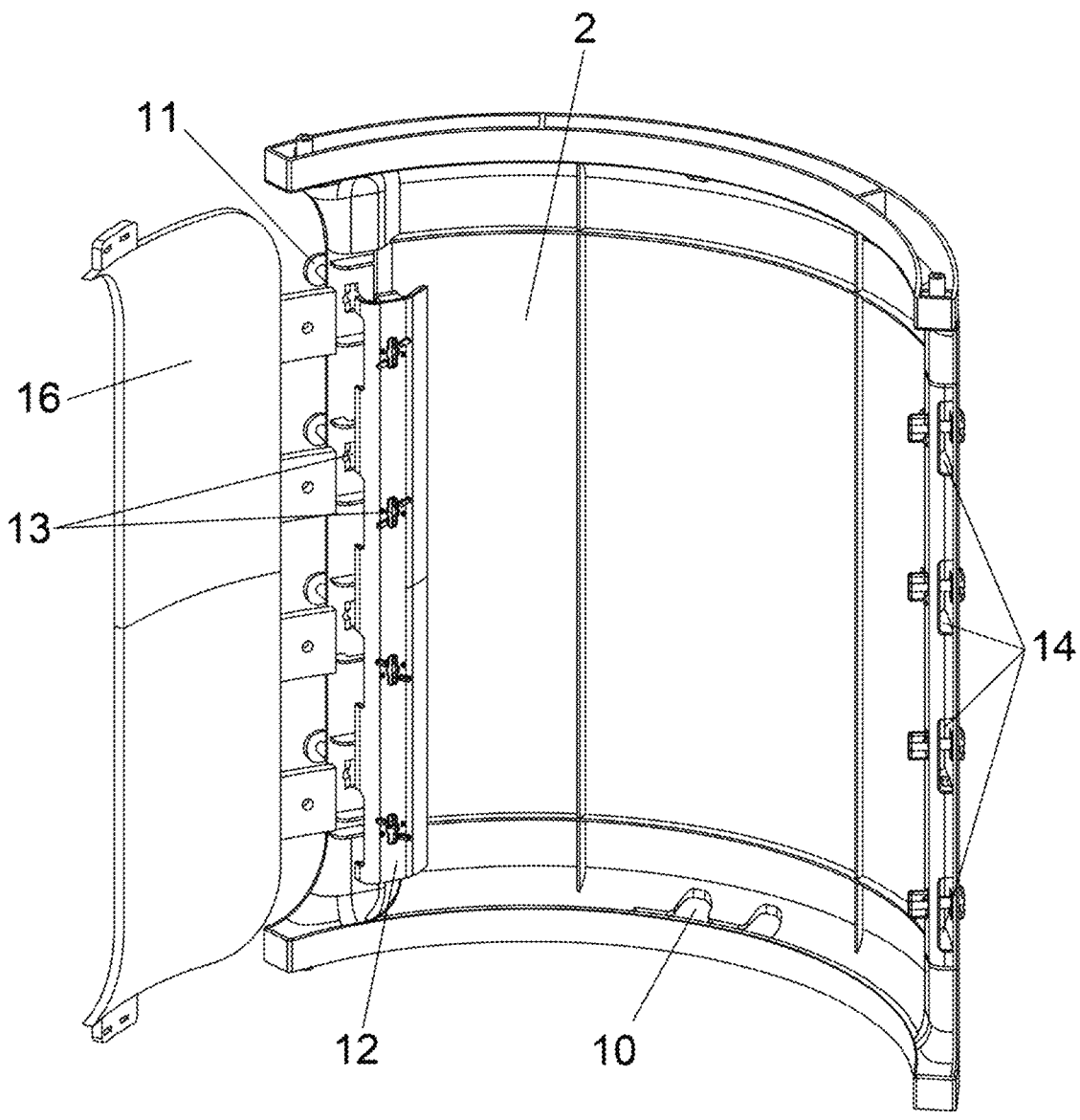
FIG. 5 is a schematic structural diagram of a side plate fixed with a felt according to the present disclosure.

As shown in FIG. 5, both sides of the side plate 2 are provided with a twist fastener 11 and an insert connector 12, respectively. A locking hole 13 is formed in each of the insert connector 12 and the side plate 2. After the insert connector 12 is fixed to the side plate 2, an elongated hole 14 formed at a joint of the insert connector 12 and the side plate 2 is configured for being inserted with a first felt 16. The twist fastener 11 is inserted into the side plate 2, and then is rotatably fixed after passing through the first felt 16 and locking holes 13 formed in the insert connector 12, such that the first felt 16 can be fixed to the side plate 2, and the first felt 16 can be prevented from being torn down by the cat.

Figure 6:
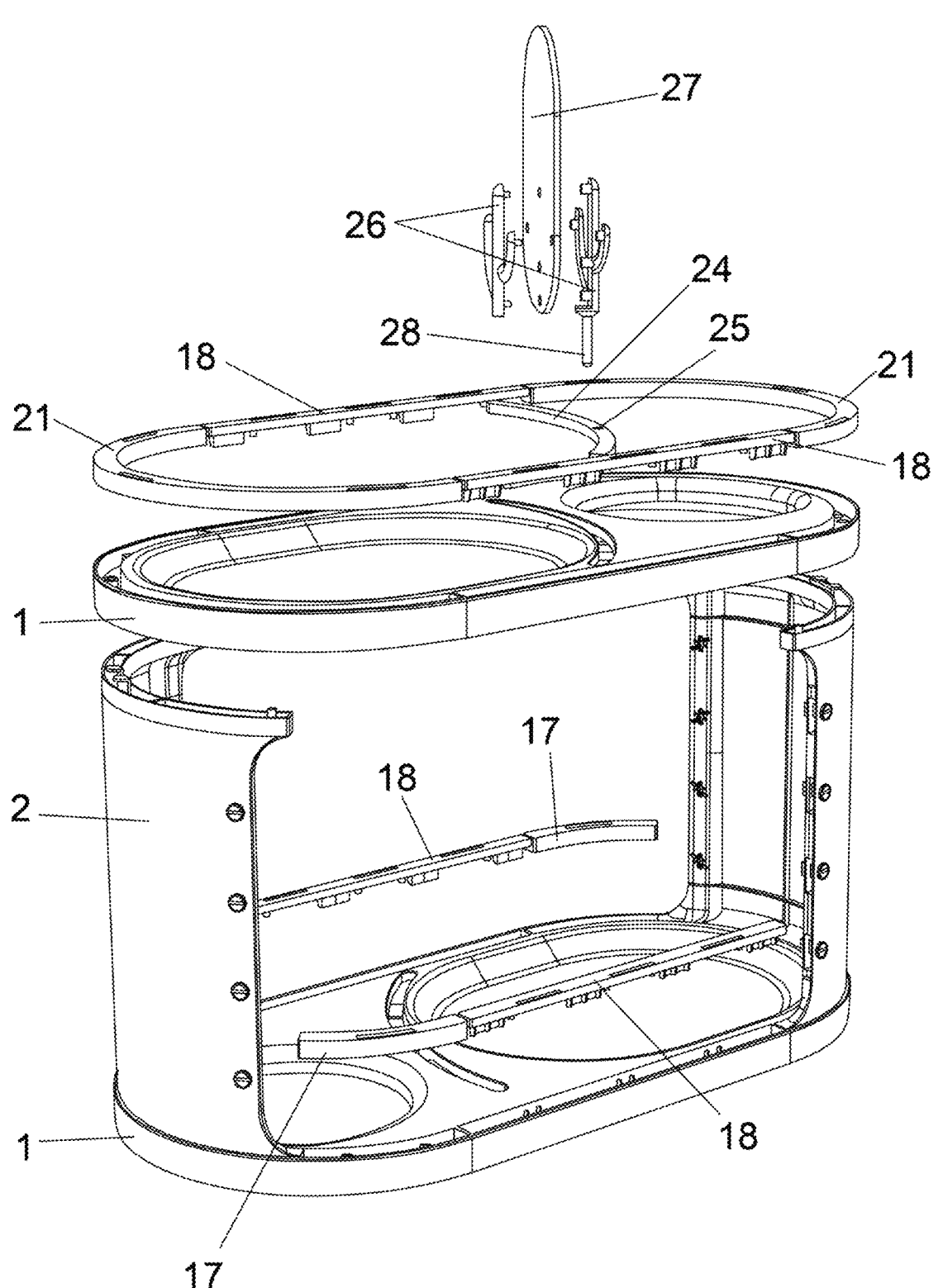
FIG. 6 is an arrangement schematic diagram of a seal on a transverse plate according to the present disclosure.
Figure 7:
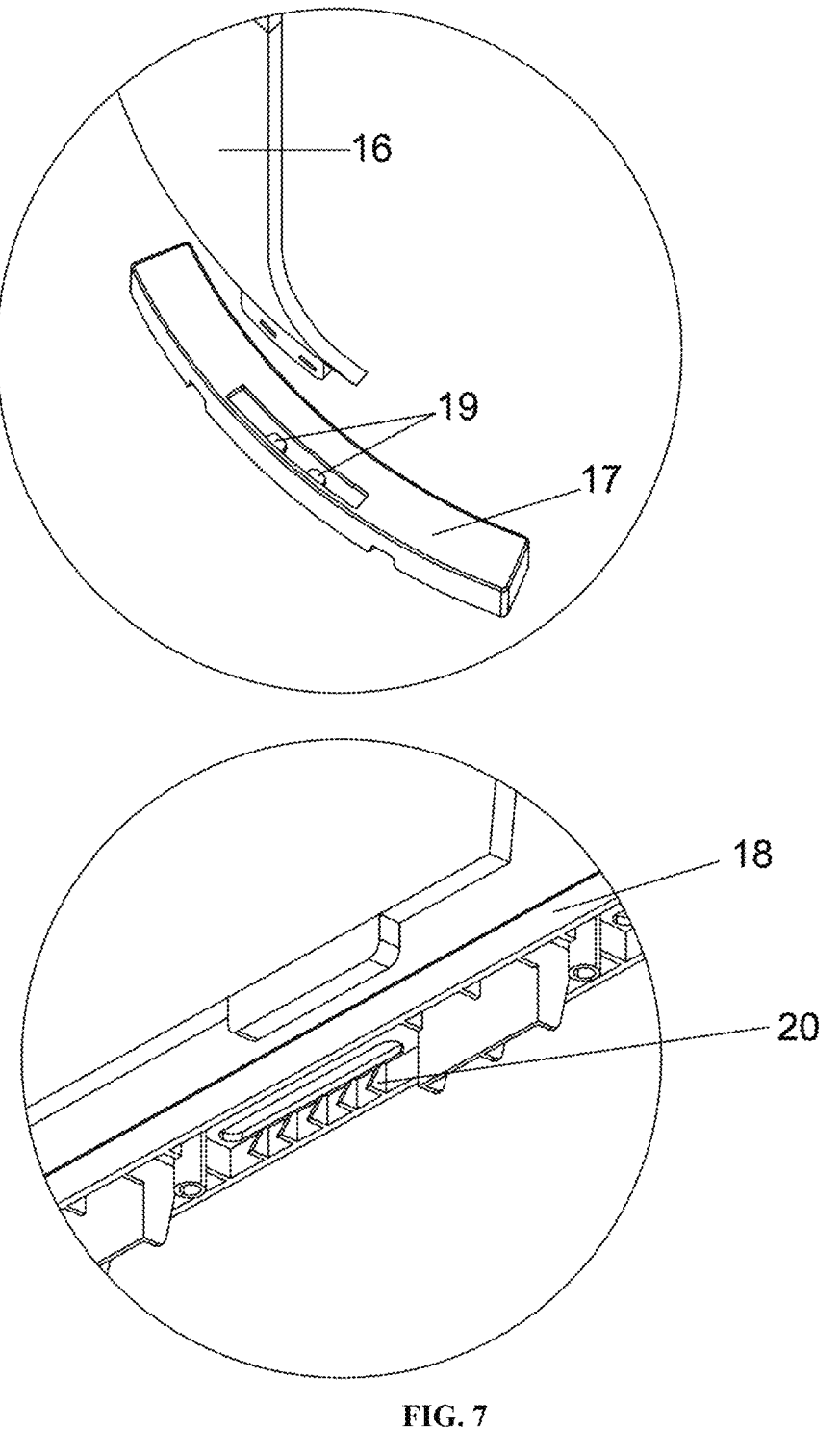
FIG. 7 is a schematic diagram showing the fixation of a felt by two type of seals according to the present disclosure.

As shown in FIG. 6 and FIG. 7, the lower transverse plate 1 is provided with a connector set. The connector set includes a short seal 17, a long seal 18 and a central seal 24. An opening is formed in the short seal 17, and a protruded member 19 is arranged on an inner side of the short seal 17. The felt can penetrate through the opening, a hole on the felt is hooked by the protruded member 19, such that the effect of fixing the felt is achieved. The fixation effect of the short seal 17 is better, and thus can be installed in a groove at a bottom ring of the transverse plate 1 for fixing the suspended felt. An opening is formed in the long seal 18, and a barb member 20 is arranged beneath the opening in the long seal 18. The barb member 20 has a narrow upper part and a wide lower part. The felt, after being inserted into the opening in the long seal 18, can be tightly hooked by the barb member 20, and thus a certain effect of fixing the felt is also achieved.

The central seal 24 is arranged in the slot in the middle of the transverse plate 1, a circular hole is formed in the central seal 24, and a rotating member 26 can be inserted into the circular hole. The rotating member 26 is divided into two pieces for opposite insertion, and can be used for clamping the second felt 27. An opening 28 is formed in the bottom of the rotating member 26, the rotating member 26 can pass through the transverse plate 1, and a cat tool can be hung at an opening site 28.

Figure 8:
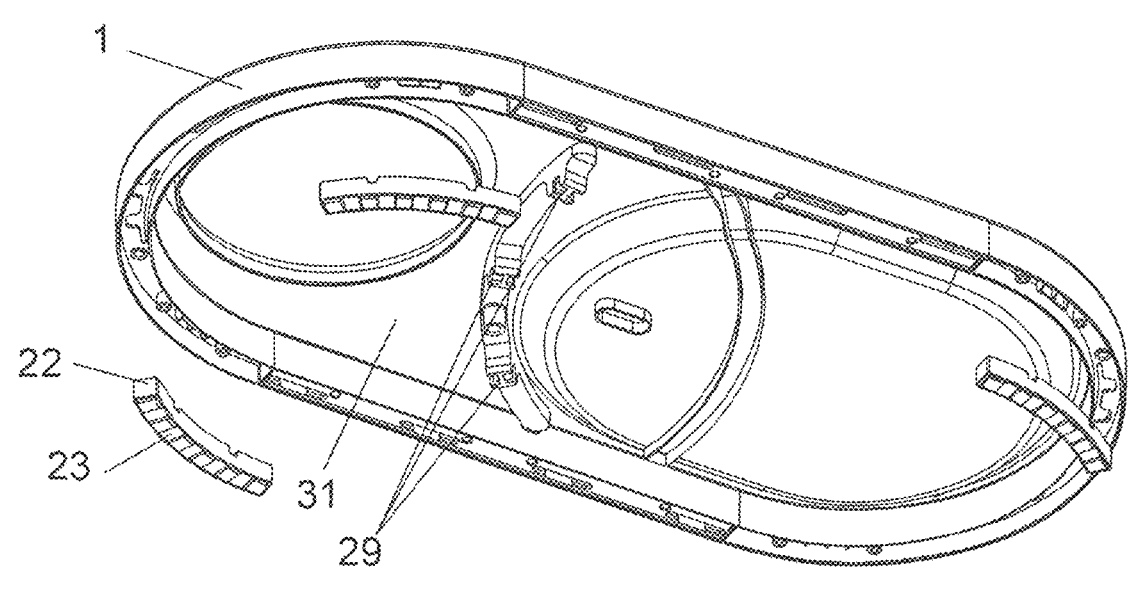
FIG. 8 is a schematic diagram of a transverse plate at a bottom layer according to the present disclosure.
Figure 9:
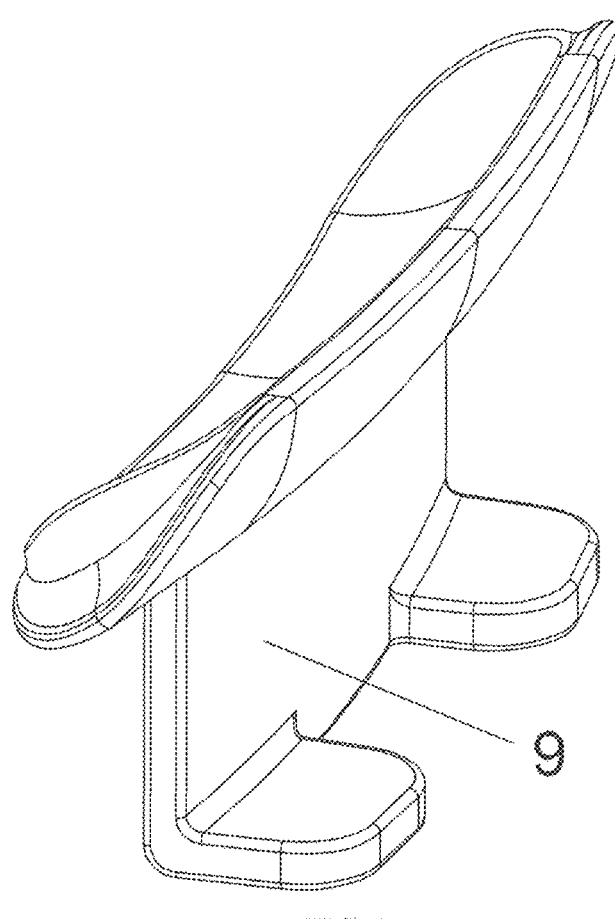
FIG. 9 is a schematic diagram of a slide latch.

As shown in FIG. 8, when the transverse plate 1 is a transverse plate at a bottom layer of the combined cat house, a foot-pad member 22 is arranged on a corresponding one of the slots formed in the lower side face 31 of each of the one of the transverse plates at the bottom layer of the combined cat house, and a soft foot pad 23 is arranged at the bottom of the foot-pad member 22 to play an anti-skid role.

As shown in FIG. 1 and FIG. 5, any two single-level cat houses adjacent to each other up and down are connected by the same transverse plate 1. In any single-level or multi-level cat house, the connector set on the top transverse plate 1 has one central seal 24, two semicircular seals 21 and two long seals 18, which has the effects of fixing the felt, reducing the exposure of reinforcing ribs and making the surface of the transverse plate more complete and more beautiful.

As shown in FIG. 6 and FIG. 7, multiple hanging holes 29 are formed in the bottom of the transverse plate 1 at the position corresponding to the arc groove 5, which can be configured for hanging cat teasing products and the like.

The combined cat house is made of a light plastic material, which greatly reduces the weight of the product and makes the transportation more convenient and economical. Simple assembly makes the installation easy, and there is no need of complicated tools or professional skills. In addition, in the design of the product, by considering the comfort of cats, a spacious and comfortable activity space is provided, thus creating a pleasant living environment for cats. Therefore, not only are the transportation and installation problems of the traditional cat house are solved, but also more affordable and comfortable choices are provided, and better use experience and quality of life are brought to the consumer.

The basic principles, main features and advantages of the present disclosure have been shown and described above. It is apparent to those skilled in the art that the present disclosure is not limited to the details of the above exemplary embodiments, and can be implemented in other specific forms without departing from the spirit or basic features of the present disclosure. Therefore, the embodiments should be considered as exemplary and non-restrictive in all aspects, and the scope of the present disclosure is defined by the appended claims rather than the above description, so it is intended to embrace all changes that fall within the meaning and range of equivalents of the claims. Any reference numerals in the claims should not be regarded as limiting the claims involved.

It should be understood that the present disclosure is not limited to the specific embodiments described here, and various obvious changes, readjustments and substitutions can be made by those skilled in the art without departing from the scope of protection of the present disclosure. Therefore, although the present disclosure has been described in detail through the above embodiments, the present disclosure is not limited to the above embodiments, and may include more other equivalent embodiments without departing from the concept of the present disclosure, and the scope of the present disclosure is determined by the scope of the appended claims.

What is claimed is:

1. A combined cat house capable of being built in levels, comprising:
a single-level cat house comprising:

transverse plates each having a lower side face and an upper side face, a plurality of slots are formed in the lower side face and upper side face of each of the transverse plates,
side plates having a left side plate and a right side plate, and
a central separator plate; the transverse plates having an upper transverse plate and a lower transverse plate;
wherein the left side plate, the right side plate and the central separator plate are fixed to the upper transverse plate and the lower transverse plate by the plurality of slots in an inserting manner;
a transverse plate hole for passing through is formed in each of the transverse plates, and a separator plate hole for passing through is formed in the central separator plate; and
wherein a multi-level cat house is formed by continuously inserting the side plates, the central separator plate and the transverse plates, wherein each of an upper side and a lower side of each of the left side plate and the right side plate is provided with a slide latch, the slide latch is slidingly fixed after passing through slide latch holes in a corresponding one of the side plates and a corresponding one of the transverse plates.

2. The combined cat house capable of being built in levels according to claim 1, wherein the plurality of slots comprise semi-circular grooves on both sides of each of the transverse plates and an arc groove in a middle of each of the transverse plates, each of the semi-circular grooves is configured for being inserted with a corresponding one of the side plates, and the arc groove is configured for being inserted with the central separator plate.

3. The combined cat house capable of being built in levels according to claim 1, wherein both sides of each of the left side plate and the right side plate are provided with a twist fastener and an insert connector, respectively;
a locking hole is formed in each of the insert connector and the respective side plate;
the combined cat house comprises a first felt;
after the insert connector is fixed to the side plate, an elongated hole formed at a joint of the insert connector and the corresponding one of the side plates is configured for being inserted with the first felt; and
the twist fastener is inserted into the corresponding one of the left side plate or the right side plate, and then is rotatably fixed after passing through the first felt and the locking hole formed in the insert connector.

4. The combined cat house capable of being built in levels according to claim 1, wherein each of the transverse plates is provided with a connector set.

5. The combined cat house capable of being built in levels according to claim 4, wherein the connector set comprises a short seal and a long seal;
an opening is formed in each of the short seal and the long seal, a protruded member is arranged on an inner side of the short seal; and
an opening is formed in the long seal, and a barb member is arranged beneath the opening of the long seal.

6. The combined cat house capable of being built in levels according to claim 4, wherein the connector set comprises a central seal arranged in one of the plurality of slots in a middle of each of the transverse plates, and a circular hole is formed in the central seal, and a rotating member is inserted into the circular hole.

7. The combined cat house capable of being built in levels according to claim 1, wherein when one of the transverse plates is a transverse plate at a bottom layer of the combined cat house, a foot-pad member is arranged on a corresponding one of the slots formed in the lower side face of each of the one of the transverse plates at the bottom layer of the combined cat house, and a soft foot pad is arranged at a bottom of the foot-pad member.

8. The combined cat house capable of being built in levels according to claim 1, wherein any two single-level cat houses adjacent to each other up and down are connected by a same one of the transverse plates.

9. The combined cat house capable of being built in levels according to claim 1, wherein a hanging hole is formed in the lower side face of each of the transverse plates.

\* \* \* \* \*